(12) United States Patent
Hao et al.

(10) Patent No.: US 10,771,507 B2
(45) Date of Patent: Sep. 8, 2020

(54) SECURE COMMUNICATION METHOD OF IMS SYSTEM BASED ON KEY FILE

(71) Applicant: AnKang HENTE Technology Co., Ltd, Ankang, Shaanxi (CN)

(72) Inventors: Lihong Hao, Shaanxi (CN); Jiuchang Qin, Shaanxi (CN); Yuanlin Ma, Shaanxi (CN)

(73) Assignee: AnKang HENTE Technology Co., Ltd., Ankang (CN)

( * ) Notice: Subject to any disclaimer, the term of this patent is extended or adjusted under 35 U.S.C. 154(b) by 167 days.

(21) Appl. No.: 16/132,171

(22) Filed: Sep. 14, 2018

(65) Prior Publication Data

US 2020/0021624 A1  Jan. 16, 2020

(30) Foreign Application Priority Data

Jul. 10, 2018  (CN) .......................... 2018 1 0752042

(51) Int. Cl.
*H04L 29/06* (2006.01)
*H04W 12/06* (2009.01)

(52) U.S. Cl.
CPC .......... *H04L 65/1016* (2013.01); *H04L 63/06* (2013.01); *H04L 63/08* (2013.01); *H04W 12/06* (2013.01)

(58) Field of Classification Search
CPC ..... H04L 65/1016; H04L 63/06; H04L 63/08; H04L 65/1073; H04L 63/083; H04L 63/0876; H04W 12/06; H04W 12/00512; H04W 12/0609
See application file for complete search history.

(56) References Cited

U.S. PATENT DOCUMENTS

2005/0060551 A1* 3/2005 Barchi .................... H04L 63/08
713/182
2008/0244266 A1* 10/2008 Cai ........................ H04L 9/3271
713/170

(Continued)

FOREIGN PATENT DOCUMENTS

| CN | 101478753 B | 12/2010 |
| CN | 102196426 B | 11/2014 |
| CN | 106686011 A | 5/2017 |

*Primary Examiner* — Mohammed Waliullah
(74) *Attorney, Agent, or Firm* — Wayne & Ken, LLC; Tony Hom

(57) ABSTRACT

Disclosed is a secure communication method of an IMS system based on a key file. The method includes obtaining an IMS account before sending the account and authentication information to a background server by a UE; generating an electronic work order by the background sever according to the received authentication information to enable customer service personnel to manually audit the authentication information and the IMS account according to a preset rule and the electronic work order; generating an encrypted key file and sending the file to the UE when determining the correctness of the authentication information and the IMS account; and activating the IMS account according to the key file and performing network communication according to the IMS account. The disclosure improves the communication security of the IMS system by using the activated IMS account for network communication.

7 Claims, 1 Drawing Sheet

(56) References Cited

U.S. PATENT DOCUMENTS

| | | | | |
|---|---|---|---|---|
| 2008/0310637 | A1* | 12/2008 | Li | H04L 63/10 |
| | | | | 380/278 |
| 2010/0263032 | A1* | 10/2010 | Bhuyan | H04L 63/168 |
| | | | | 726/7 |
| 2013/0227651 | A1* | 8/2013 | Schultz | H04L 63/0861 |
| | | | | 726/4 |
| 2015/0033300 | A1* | 1/2015 | Timariu | H04L 65/1069 |
| | | | | 726/5 |

* cited by examiner

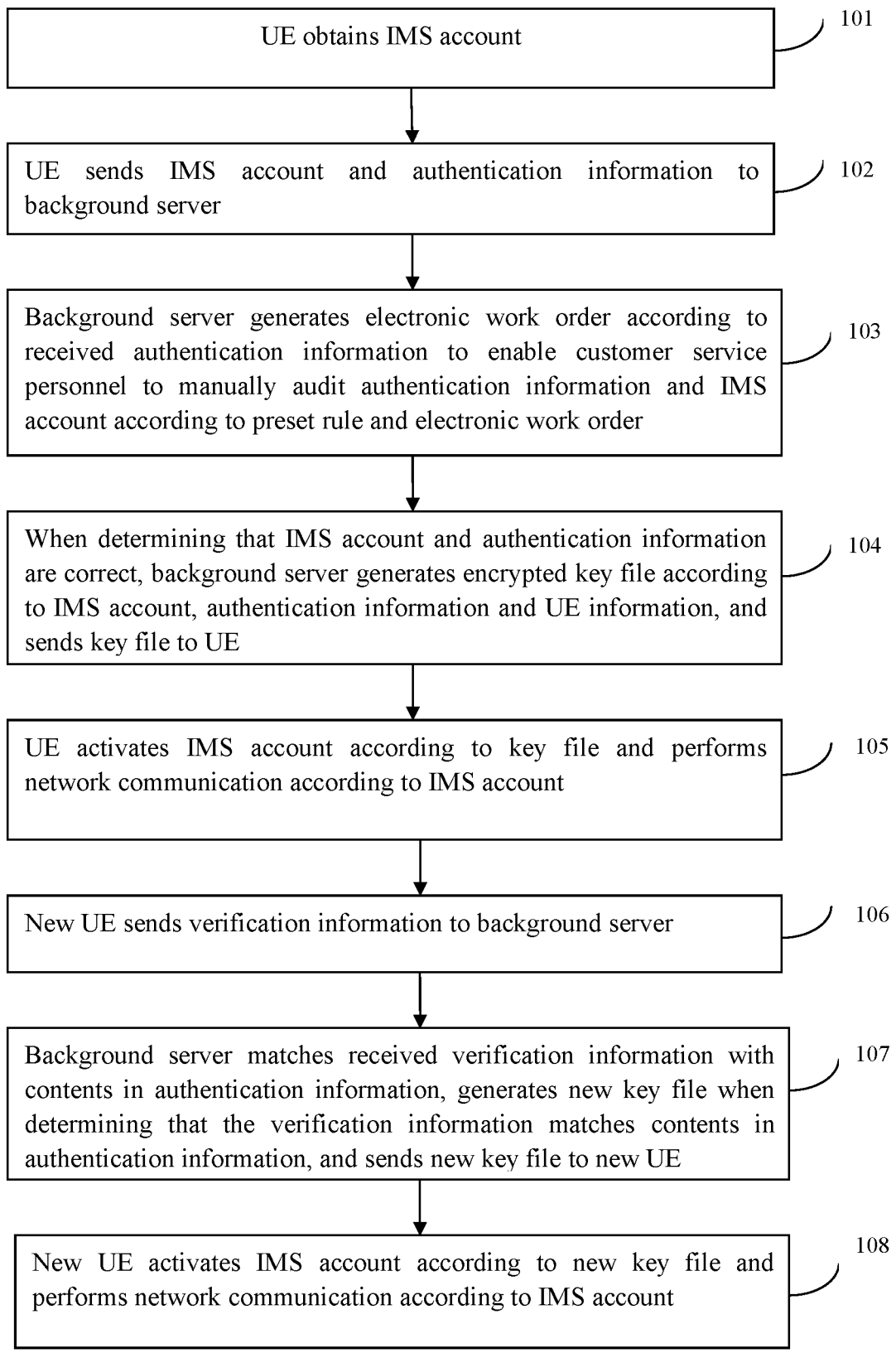

SECURE COMMUNICATION METHOD OF IMS SYSTEM BASED ON KEY FILE

CROSS-REFERENCE TO RELATED APPLICATIONS

This application claims to Chinese application No. 201810752042.9 with a filing date of Jul. 10, 2018. The content of the aforementioned applications, including any intervening amendments thereto, are incorporated herein by reference.

TECHNICAL FIELD

The disclosure relates to the field of communication technology, in particular to a secure communication method of an IMS system based on a key file.

BACKGROUND

IMS is the next generation communication network convergence scheme proposed by Lucent. As of 2003, international authoritative organizations generally regard IMS as the core standard for NGN network convergence and service and technology innovation. However, IMS-based communication systems directly establish communication connections when communicating without network access authentication and identity authentication on IMS, making the communication of the IMS systems less secure.

SUMMARY

In view of this, the present disclosure provides a secure communication method of an IMS system based on a key file, which activates an IMS account according to information in the key file and uses the activated IMS account for network communication, thus improving the communication security of the IMS system.

The disclosure solves the above problems by the following technical solution:

A secure communication method of an IMS system based on a key file, including the following steps: obtaining an IMS account by a UE; sending the IMS account and authentication information to a background server by the UE; generating an electronic work order by the background server according to the received authentication information to enable customer service personnel to manually audit the authentication information and the IMS account according to a preset rule and the electronic work order; generating an encrypted key file by the background server according to the IMS account, the authentication information and UE information and sending the key file to the UE when determining that the IMS account and the authentication information are correct; adding the IMS account, an IMS account password, the UE information and attribute information of the background server to the key file; and activating the IMS account by the UE according to the key file and performing network communication according to the IMS account.

Further, after the UE activates the IMS account according to the key file and performs network communication according to the IMS account, the method further includes: sending verification information to the background server by a new UE; matching the received verification information with contents in the authentication information by the background server, generating a new key file when determining that the verification information matches the contents in the authentication information, and sending the new key file to the new UE; adding the IMS account, the IMS account password, new UE information and the background server attribute information to the new key file; and activating the IMS account by the new UE according to the new key file and performing network communication according to the IMS account.

Further, the UE includes a user's mobile phone. Obtaining the IMS account by the UE includes obtaining an IMS account selected by a user from an IMS account list by the user's mobile phone. Sending the IMS account and authentication information to the background server by the UE includes sending the IMS account, user identity information and user password information to the background server by the user's mobile phone.

Further, the UE information includes software ID information, hardware information, and geographic location information of the user's mobile phone. The software ID information of the user's mobile phone includes an IP address and a domain name of the user's mobile phone, and the hardware information of the user's mobile phone includes IMEI, MEID, or a hard disk.

Further, the UE includes a computer. Obtaining the IMS account by the UE includes obtaining an IMS account corresponding to a contract number by the computer. The contract number is a code specified by the computer manufacturer and an IMS company. Sending the IMS account and authentication information to the background server by the UE includes sending the IMS account and hardware information of the computer to the background server by the computer. The hardware information of the computer includes hard disk information of the computer and a MAC address of the computer.

Further, the UE information includes software ID information and geographic location information of the computer. The software ID information of the computer includes an IP address and a domain name of the computer.

Further, the background server attribute information includes an IP address, domain name information and authentication information of the background server, and an IP address and domain name information of a backup background server.

The secure communication method of the IMS system based on the key file has the following beneficial effects that the UE sends the IMS account and authentication information to the background server which audits the received IMS account and authentication information. When determining that the IMS account and authentication information are correct, the background server generates the encrypted key file. The IMS account, IMS password and other information are added to the key file, so that when receiving the key file, the UE activates the IMS account according to the information in the key file, and then performs network communication through the IMS account. According to the present disclosure, since the encrypted key file added with the IMS account, the IMS password and other information are generated by the background server before IMS network communication, the information such as the password related to the IMS account will not be leaked, and the communication security of the IMS system is improved when the activated IMS account is used for network communication.

BRIEF DESCRIPTION OF THE DRAWINGS

The present disclosure will be further described with reference to the accompanying drawings and embodiments.

FIG. 1 is a flowchart of a secure communication method of an IMS system based on a key file according to the present disclosure.

DETAILED DESCRIPTION OF THE PRESENT DISCLOSURE

The present disclosure will be described below in detail with reference to the accompanying drawings. As shown in FIG. 1, a secure communication method of an IMS system based on a key file of this embodiment includes the following steps:

101. A UE obtains an IMS account.

Specifically, the method of obtaining the IMS account varies according to different UEs, which includes:

obtaining an IMS account selected by the user from an IMS account list by the user's mobile phone, when the UE includes a user's mobile phone; and obtaining an IMS account corresponding to a contract number by the computer, when the UE includes a computer.

The contract number is a code specified by a computer manufacturer and an IMS company.

102. The UE sends the IMS account and authentication information to a background server.

Specifically, when the UE includes the user's mobile phone, the authentication information includes user identity information and user password information, and the user's mobile phone sends the IMS account, user identity information and user password information to the background server.

The user password information includes a user digital character password, a fingerprint, or face recognition information.

When the UE includes the computer, the authentication information includes computer hardware information, and the computer sends the IMS account and computer hardware information to the background server.

103. The background server generates an electronic work order according to the received authentication information to enable customer service personnel to manually audit the authentication information and the IMS account according to a preset rule and the electronic work order.

The preset rule is to check contents of the authentication information one by one with information stored in advance. If the contents of the authentication information are the same as the information stored in advance, it is determined that the audit passes; and if the contents of the authentication information are different from the information stored in advance, it is determined that the audit fails.

104. When determining that the IMS account and the authentication information are correct, the background server generates an encrypted key file according to the IMS account, the authentication information and the UE information, and sends the key file to the UE.

The IMS account, IMS account password, UE information and background server attribute information are added to the key file, and the background server attribute information includes an IP address, domain name information and authentication information of the background server, and an IP address and domain name information of a backup background server.

Specifically, when the UE includes the user's mobile phone, the UE information includes software ID information, hardware information and geographic location information of the user's mobile phone, wherein the software ID information of the user's mobile phone includes an IP address and a domain name of the user's mobile phone, and the hardware information of the user's mobile phone includes IMEI, MEID or a hard disk.

When the UE includes a computer, the UE information includes software ID information and geographic location information of the computer, wherein the software ID information of the computer includes an IP address and a domain name of the computer.

It should be noted that when determining that the authentication information and the IMS account are incorrect, the background server sends a registration failure message to the UE.

105. The UE activates the IMS account according to the key file and performs network communication according to the IMS account.

Specifically, when the UE includes the user's mobile phone, the user's mobile phone parses the key file after receiving the key file to obtain and add the IMS account, the IMS account password, the software ID information, hardware information and geographic location information of the user's mobile phone and the background server attribute information into corresponding software, so as to finally realize activation of the IMS account, ensuring that the user's mobile phone performs network communication through the activated IMS account.

When the UE includes the computer, the computer parses the key file after receiving the key file to obtain and add the IMS account, the IMS account password, the software ID information, hardware information and geographic location information of the computer and the background server attribute information into corresponding software, so as to finally realize activation of the IMS account, ensuring that the computer performs network communication through the activated IMS account.

106. A new UE sends verification information to the background server.

107. The background server matches the received verification information with the contents in the authentication information, generates a new key file when determining that the verification information matches the contents in the authentication information, and sends the new key file to the new UE.

The new key file is added with the IMS account, the IMS account password, new UE information and the background server attribute information.

108. The new UE activates the IMS account according to the new key file and performs network communication according to the IMS account.

Specifically, when the user replaces the UE with the new UE, the verification information such as the user digital character password, the fingerprint or the face recognition information sent by the previous UE needs to be sent to the background server. The background server compares the received verification information such as the user digital character password, the fingerprint or the face recognition information with the previous authentication information. When it is determined that the received verification information such as the user digital character password, the fingerprint or the face recognition information is the same as the previous authentication information, the new UE is determined to be legal. At this time, a new key file is generated and sent to the new UE to enable the new UE to activate the IMS account according to the information in the new key file and perform communication.

It should be noted that the UE in the present disclosure may also be other intelligent terminals, such as tablet computers, etc., and the present disclosure is not limited thereto.

In the secure communication method of the IMS system based on the key file provided by the disclosure, the UE sends the IMS account and authentication information to the background server which audits the received IMS account and authentication information. When determining that the IMS account and authentication information are correct, the background server generates the encrypted key file. The IMS account, IMS password and other information are added to the key file, so that when receiving the key file, the UE activates the IMS account according to the information in the key file, and then performs network communication through the IMS account. According to the present disclosure, since the encrypted key file added with the IMS account, the IMS password and other information are generated by the background server before IMS network communication, the information such as the password related to the IMS account will not be leaked, and the communication security of the IMS system is improved when the activated IMS account is used for network communication.

Finally, the above embodiments are intended only to illustrate other than to limit the technical scheme of the present disclosure. Although the present disclosure has been described in detail with reference to the preferred embodiments, it will be understood by those of ordinary skill in the art that modifications or equivalent substitutions can be made to the technical scheme of the present disclosure without departing from the spirit and scope of the technical scheme of the present disclosure, which should all be included within the scope of the claims of the present disclosure.

What is claimed is:

1. A secure communication method of an IMS (IP Multimedia Subsystem) system based on a key file, comprising the following steps:
    obtaining an IMS account by a UE;
    sending the IMS account and authentication information to a background server by the UE;
    generating an electronic work order by the background server according to the received authentication information to enable customer service personnel to manually audit the authentication information and the IMS account according to a preset rule and the electronic work order;
    generating a key file by the background server according to the IMS account, the authentication information and UE information and sending the key file to the UE when determining that the IMS account and the authentication information are correct;
    adding the IMS account, an IMS account password, the UE information and attribute information of the background server to the key file; and
    activating the IMS account by the UE according to the key file and performing network communication according to the IMS account.

2. The secure communication method of the IMS system based on the key file according to claim 1, wherein after the UE activates the IMS account according to the key file and performs network communication according to the IMS account, the method further comprises:
    sending verification information to the background server by a new UE;
    matching the received verification information with contents in the authentication information by the background server, generating a new key file when determining that the verification information matches the contents in the authentication information, and sending the new key file to the new UE;
    adding the IMS account, the IMS account password, new UE information and the background server attribute information to the new key file; and
    activating the IMS account by the new UE according to the new key file and performing network communication according to the IMS account.

3. The secure communication method of the IMS system based on the key file according to claim 2, wherein the UE comprises a user's mobile phone;
    obtaining the IMS account by the UE comprises:
    obtaining an IMS account selected by a user from an IMS account list by the user's mobile phone; and
    sending the IMS account and authentication information to the background server by the UE comprises:
    sending the IMS account, user identity information and user password information to the background server by the user's mobile phone.

4. The secure communication method of the IMS system based on the key file according to claim 3, wherein the UE information comprises software ID information, hardware information and geographic location information of the user's mobile phone; the software ID information of the user's mobile phone comprises an IP address and a domain name of the user's mobile phone; and the hardware information of the user's mobile phone comprises IMEI, MEID, or a hard disk.

5. The secure communication method of the IMS system based on the key file according to claim 2, wherein the UE comprises a computer;
    obtaining the IMS account by the UE comprises:
    obtaining an IMS account corresponding to a contract number by the computer; wherein the contract number is a code specified by a computer manufacturer and an IMS company;
    sending the IMS account and authentication information to the background server by the UE comprises:
    sending the IMS account and hardware information of the computer to a background server by the computer;
    wherein the hardware information of the computer comprises hard disk information of the computer and a MAC address of the computer.

6. The secure communication method of the IMS system based on the key file according to claim 5, wherein the UE information comprises software ID information and geographic location information of the computer; and the software ID information of the computer comprises an IP address and a domain name of the computer.

7. The secure communication method of the IMS system based on the key file according to any one of claim 1, wherein the background server attribute information comprises an IP address, domain name information and authentication information of the background server, and an IP address and domain name information of a backup background server.

* * * * *